(12) United States Patent
Sasaki et al.

(10) Patent No.: US 10,310,176 B2
(45) Date of Patent: Jun. 4, 2019

(54) MULTI-CORE FIBER

(71) Applicants: FUJIKURA LTD., Tokyo (JP); NATIONAL UNIVERSITY CORPORATION HOKKAIDO UNIVERSITY, Hokkaido (JP)

(72) Inventors: Yusuke Sasaki, Sakura (JP); Katsuhiro Takenaga, Sakura (JP); Kunimasa Saitoh, Sapporo (JP)

(73) Assignees: FUJIKURA LTD., Tokyo (JP); NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 15/571,530

(22) PCT Filed: May 20, 2016

(86) PCT No.: PCT/JP2016/064971
§ 371 (c)(1),
(2) Date: Nov. 3, 2017

(87) PCT Pub. No.: WO2016/190228
PCT Pub. Date: Dec. 1, 2016

(65) Prior Publication Data
US 2018/0120502 A1 May 3, 2018

(30) Foreign Application Priority Data
May 27, 2015 (JP) .................................. 2015-107929

(51) Int. Cl.
G02B 6/02 (2006.01)
G02B 6/036 (2006.01)

(52) U.S. Cl.
CPC ........... *G02B 6/02042* (2013.01); *G02B 6/02* (2013.01); *G02B 6/02023* (2013.01); *G02B 6/03694* (2013.01)

(58) Field of Classification Search
None
See application file for complete search history.

(56) References Cited

U.S. PATENT DOCUMENTS 5,479,550 A * 12/1995 Nishioka ............... C03B 37/028
385/116
5,689,578 A 11/1997 Yamauchi et al.
(Continued)

FOREIGN PATENT DOCUMENTS

EP 637762 A1 2/1995
EP 2639608 A1 9/2013
(Continued)

OTHER PUBLICATIONS

Decision to Grant a Patent issued in corresponding Japanese Patent Application No. 2015-107929 dated May 1, 2018, with translation (6 pages).
(Continued)

*Primary Examiner* — Rhonda S Peace
(74) *Attorney, Agent, or Firm* — Osha Liang LLP

(57) ABSTRACT

A multi-core fiber performs communication using light up to an xth-order LP mode (where x is an integer of 1 or more) in a communication band. The multi-core fiber includes: a plurality of signal light propagation cores that propagate light up to an (x+1)th-order LP mode; and at least one high-loss core that has a higher loss of propagated light than the signal light propagation cores. Crosstalk occurs between light of the (x+1)th-order LP mode propagated through at least one signal light propagation core and light of a primary LP mode propagated through at least one high-loss core.

4 Claims, 5 Drawing Sheets

(56) References Cited

U.S. PATENT DOCUMENTS

| | | | | |
|---|---|---|---|---|
| 6,041,154 | A * | 3/2000 | Ono | G02B 6/06 |
| | | | | 385/115 |
| 8,285,094 | B2 * | 10/2012 | Takenaga | G02B 6/02042 |
| | | | | 385/100 |
| 9,008,479 | B2 * | 4/2015 | Tanigawa | G02B 6/02042 |
| | | | | 385/126 |
| 9,081,129 | B2 * | 7/2015 | Matsuo | G02B 6/02042 |
| 9,291,768 | B2 * | 3/2016 | Ishida | G02B 6/02042 |
| 9,405,060 | B2 * | 8/2016 | Ishida | G02B 6/02042 |
| 9,529,144 | B2 * | 12/2016 | Ishida | G02B 6/02 |
| 9,529,146 | B2 * | 12/2016 | Ishida | G02B 6/02042 |
| 9,817,183 | B2 * | 11/2017 | Amma | G02B 6/02014 |
| 9,897,751 | B2 * | 2/2018 | Hayashi | G02B 6/02042 |
| 10,101,526 | B2 * | 10/2018 | Sasaki | G02B 6/44 |
| 2011/0182557 | A1 | 7/2011 | Hayashi | |
| 2013/0243384 | A1 | 9/2013 | Matsuo et al. | |
| 2014/0178024 | A1 * | 6/2014 | Takenaga | G02B 6/02042 |
| | | | | 385/126 |
| 2017/0235043 | A1 * | 8/2017 | Amma | G02B 6/02042 |
| | | | | 385/126 |
| 2018/0120501 | A1 * | 5/2018 | Sasaki | G02B 6/02042 |
| 2018/0120502 | A1 * | 5/2018 | Sasaki | G02B 6/02042 |

FOREIGN PATENT DOCUMENTS

| | | |
|---|---|---|
| EP | 2 682 793 A1 | 1/2014 |
| JP | S49-040750 A | 4/1974 |
| JP | H06324223 A | 11/1994 |
| JP | 2011-170336 A | 9/2011 |
| JP | 2011-215394 A | 10/2011 |
| JP | 2012-118495 A | 6/2012 |
| JP | 2014-010266 A | 1/2014 |
| JP | 2015-045705 A | 3/2015 |
| WO | 94/019714 A1 | 9/1994 |
| WO | 2012/161810 A1 | 11/2012 |

OTHER PUBLICATIONS

Extended European Search Report in counterpart European Application No. 16799933.3 dated Dec. 20, 2018 (7 pages).

Office Action issued in corresponding Chinese Application No. 201680004425.7 dated Feb. 1, 2019 (7 pages).

* cited by examiner

MULTI-CORE FIBER

TECHNICAL FIELD

The present invention relates to a multi-core fiber and is suitable for improving a degree of freedom for design.

BACKGROUND ART

Presently, an optical fiber used for an optical fiber communication system spreading generally has a structure in which outer circumference of one core is surrounded by a clad and an optical signal is propagated through the core, so that information is transmitted. Recently, an amount of information transmitted increases drastically with the spread of the optical fiber communication system. According to the increase in the amount of information transmitted, in the optical fiber communication system, a large number of optical fibers such as dozens or hundreds of optical fibers are used and large-capacity long-distance optical communication is performed.

It is known that, in the optical fiber communication system, a multi-core fiber in which outer circumferences of a plurality of cores are surrounded by one clad is used and a plurality of signals are transmitted using light propagated through the individual cores.

An example of the multi-core fiber is described in Patent Literature 1 described below. In the multi-core fiber, one core is disposed on a center of a clad and six cores are disposed around the core disposed on the center. Because such an arrangement is a structure in which the cores can be disposed in a closest packing state, a large number of cores can be disposed with respect to an outer diameter of a specific clad. In addition, in the multi-core fiber described in Patent Literature 1, propagation constants of light propagated through the cores adjacent to each other are different from each other to suppress crosstalk of light propagated through the individual cores.

However, there is a request for suppressing the crosstalk more than the case in which effective refractive indexes of the cores adjacent to each other are changed like the multi-core fiber described in Patent Literature 1. Therefore, a multi-core fiber in which a low refractive index layer having a refractive index lower than a refractive index of the clad is disposed to surround an outer circumferential surface of each core and the crosstalk is further prevented is known. This multi-core fiber is described in Patent Literature 2 described below. When the multi-core fiber is viewed from a viewpoint of the refractive index, the low refractive index layer has a shape of a trench. For this reason, the multi-core fiber is called a trench type and a configuration from the core to the low refractive index layer is called a core element. Even in the trench type multi-core fiber, propagation constants of light propagated through the cores adjacent to each other are preferably different from each other to suppress the crosstalk of light propagated through the individual cores.

[Patent Literature 1] JP2011-170336 A
[Patent Literature 2] JP2012-118495 A

However, it is necessary to change refractive indexes or diameters of the cores adjacent to each other to change the propagation constants of the light propagated through the cores adjacent to each other as described above. When communication is performed using light of a desired mode in a desired wavelength band, a range of obtained values of the refractive indexes or the diameters of the cores is narrow and there is a limitation in a degree of freedom for design to change the refractive indexes or the diameters of the cores adjacent to each other.

In addition, in the trench type multi-core fiber, there is a tendency that it is hard to escape light of a higher-order mode in light propagated through a specific core or core element and a cutoff wavelength increases, when the core element is disposed to surround the specific core or core element. Therefore, to suppress propagation of light of a higher-order mode as compared with a mode of light propagated when the core element exists alone, a core pitch cannot be decreased greatly and there is a limitation in a degree of freedom for design.

SUMMARY

Accordingly, one or more embodiments of the present invention provide a multi-core fiber capable of improving a degree of freedom for design.

One or more embodiments of the present invention provide a multi-core fiber for performing communication using light up to an xth-order LP mode (where x is an integer of 1 or more) in a communication band. The multi-core fiber includes a plurality of signal light propagation cores that propagate light up to an (x+1)th-order LP mode and at least one high-loss core that has a higher loss of propagated light than the signal light propagation cores. Crosstalk occurs between light of the (x+1)th-order LP mode propagated through at least one signal light propagation core and light of a primary LP mode propagated through at least one high-loss core.

According to the multi-core fiber of one or more embodiments, because each core is a core propagating light of a higher-order mode by a 1 LP mode as compared with cores propagating the light up to the xth-order LP mode, confinement of the light up to the xth-order LP mode in the core can be intensified. Therefore, as compared with a multi-core fiber configured using the cores propagating only the light up to the xth-order LP mode, crosstalk of the light up to the xth-order mode can be suppressed. For this reason, a degree of freedom for designing a core pitch and a degree of freedom for designing a refractive index or a diameter of each core are further improved as compared with the multi-core fiber using the cores propagating the light up to the xth-order LP mode.

According to one or more embodiments, because the crosstalk occurs between the light of the (x+1)th-order LP mode propagated through the signal light propagation cores and the light of the primary LP mode propagated through the high-loss core, the light of the (x+1)th-order LP mode propagated through the signal light propagation cores can be moved to the high-loss core. For this reason, the light of the (x+1)th-order LP mode propagated through the signal light propagation cores is attenuated. In addition, because the high-loss core has the higher loss of the propagated light than the signal light propagation cores, the light moved from the signal light propagation cores to the high-loss core is also attenuated. In this way, the light of the (x+1)th-order LP mode unnecessary for communication can be eliminated.

In addition, according to one or more embodiments, a propagation constant of the light of the (x+1)th-order LP mode propagated through the signal light propagation cores and a propagation constant of the light of the primary LP mode propagated through the high-loss core are matched with each other.

According to one or more embodiments, the propagation constants are matched with each other, so that an amount of crosstalk between the light of the (x+1)th-order LP mode propagated through the signal light propagation cores and the light of the primary LP mode propagated through the high-loss core can be maximized, and the light of the (x+1)th-order LP mode propagated through the signal light propagation cores can be moved to the high-loss core more efficiently. Therefore, the light of the (x+1)th-order LP mode unnecessary for the communication can be eliminated more efficiently.

In addition, according to one or more embodiments, a propagation loss of the light propagated through the high-loss core is 3 dB/km or more.

According to one or more embodiments, the propagation loss of the light propagated through the high-loss core is 3 dB/km or more and the light is propagated by 10 km, so that power can be set to $\frac{1}{1000}$ or less.

In addition, according to one or more embodiments, a distance between the signal light propagation cores adjacent to each other is a distance at which crosstalk of the light up to the xth-order LP mode becomes −40 dB/km or less and crosstalk of the light of the (x+1)th-order LP mode becomes −30 dB/km or more.

According to one or more embodiments, an effective area of the light of the (x+1)th-order LP mode is larger than an effective area of the light up to the xth-order LP mode. By using this, the distance between the signal light propagation cores adjacent to each other can be set to the distance at which the crosstalk of the light up to the xth-order LP mode becomes −40 dB/km or less and the crosstalk of the light of the (x+1)th-order LP mode becomes −30 dB/km or more. Therefore, the crosstalk of the light up to the xth-order LP mode used for the communication is suppressed and the crosstalk of the light of the (x+1)th-order LP mode to be light unnecessary for the communication occurs. For this reason, even when there is the signal light propagation core not causing the crosstalk with the high-loss core directly, the light of the (x+1)th-order mode propagated through the corresponding signal light propagation core can be moved to the signal light propagation cores causing the crosstalk with the high-loss core, by the crosstalk, and the light can be moved to the high-loss core by the crosstalk. Therefore, the light of the (x+1)th-order LP mode propagated through the signal light propagation core not causing the crosstalk with the high-loss core directly can be eliminated.

In addition, according to one or more embodiments, the high-loss core is disposed at a position surrounded by the three or more signal light propagation cores.

According to one or more embodiments, the high-loss core is surrounded by the three or more signal light propagation cores, so that the high-loss core can cause the crosstalk with each signal light propagation core, and the light of the (x+1)th-order LP mode can be moved efficiently from the signal light propagation cores to the high-loss core.

According to one or more embodiments, the multi-core fiber further includes an extension portion that extends such that diameters of the plurality of signal light propagation cores decrease, in a part of the plurality of signal light propagation cores in a longitudinal direction. In the extension portion, the plurality of signal light propagation cores propagate the light up to the xth-order LP mode and propagation of the light of the (x+1)th-order LP mode is suppressed. In this case, in the extension portion, a loss of the light of the (x+1)th-order LP mode propagated through the plurality of signal light propagation cores is 20 dB or more.

According to one or more embodiments, the extension portion is provided, so that a higher loss of the light of the (x+1)th-order LP mode can be caused, and light of a mode unnecessary for the communication can be eliminated more appropriately.

In addition, according to one or more embodiments, x may be 1. According to the multi-core fiber of one or more embodiments having the above configuration, a multi-core fiber for single mode in which crosstalk is further improved as compared with a multi-core fiber using only cores propagating only light of a basic mode in the related art can be achieved.

As such, according to one or more embodiments of the present invention, a multi-core fiber capable of improving a degree of freedom for design is provided.

DETAILED DESCRIPTION

Figure 1:
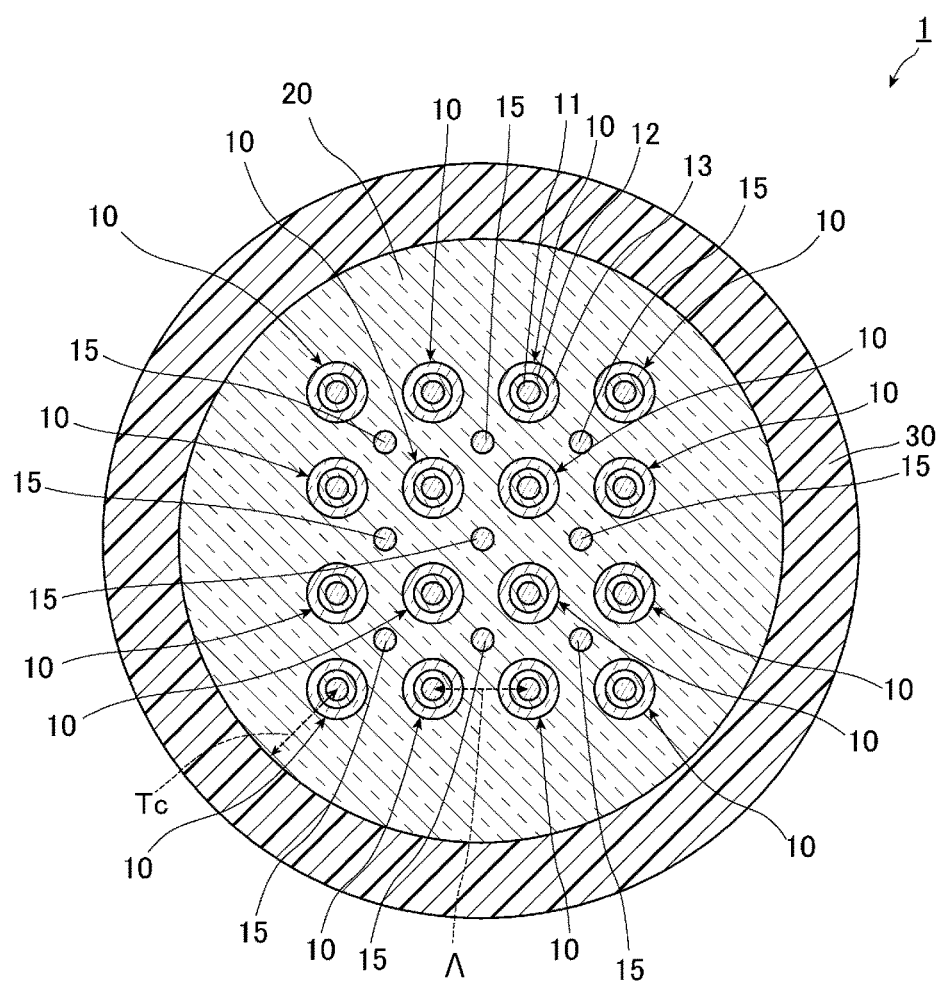
FIG. 1 is a cross-sectional view of a multi-core fiber according to one or more embodiments of the present invention, vertical to a longitudinal direction.

Hereinafter, embodiments of a multi-core fiber according to the present invention will be described in detail with reference to the drawings. To facilitate understanding, scales in the drawings and scales in the following description may be different from each other.

FIG. 1 is a diagram illustrating an aspect of a multi-core fiber according to one or more embodiments. As illustrated in FIG. 1, a multi-core fiber 1 includes a plurality of core elements 10, a plurality of high-loss cores 15, a clad 20 that surrounds the individual core elements 10 and the high-loss core 15 without clearance, and a cover layer 30 that covers the clad 20.

Each core element 10 is disposed on each lattice point of a square lattice. Specifically, the 4 core elements 10 are disposed to be located at individual vertexes of a square shape so as to surround a center of the clad 20 and the 12 core elements 10 are disposed on individual lattice points of a square lattice based on the square shape to surround the 4 core elements 10. In this way, in one or more embodiments, the 16 core elements 10 are disposed.

Each core element 10 has the same structure. Each of the core elements 10 has a core 11 which functions as a signal light propagation core to propagate signal light, an inner clad 12 which surrounds an outer circumferential surface of the core 11 without clearance, and a low refractive index layer 13 which surrounds an outer circumferential surface of the inner clad 12 without clearance and of which an outer circumferential surface is surrounded by the clad 20 without clearance.

In addition, each of the plurality of high-loss cores 15 is disposed on a center of each square lattice. Therefore, each high-loss core 15 is surrounded by the 4 core elements 10. In this way, in one or more embodiments, the 9 high-loss cores 15 are disposed and all of the core elements 10 are adjacent to at least one high-loss core 15.

Figure 2:
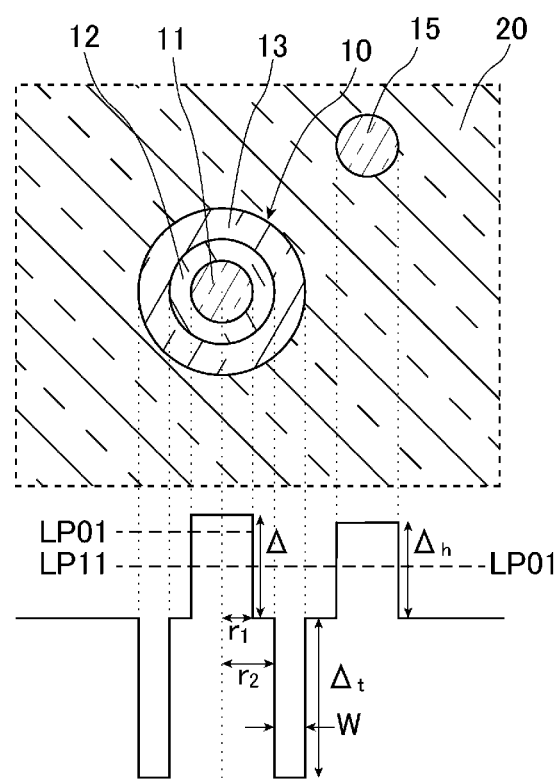
FIG. 2 is a diagram illustrating a refractive index profile of core elements and a high-loss core in the multi-core fiber of FIG. 1.

FIG. 2 is a diagram illustrating a refractive index profile of the individual core elements 10 and the high-loss core 15 of the multi-core fiber 1 illustrated in FIG. 1.

As illustrated in FIG. 2, a refractive index of the core 11 of the core element 10 is higher than a refractive index of the inner clad 12 and a refractive index of the clad 20, and a refractive index of the low refractive index layer 13 is lower than the refractive index of the inner clad 12 and a refractive index of the clad 20. As such, when each core element 10 is viewed from a viewpoint of the refractive index, each low refractive index layer 13 has a groove shape and each core element 10 has a trench structure. By the trench structure, confinement of light propagated through each core 11 of the multi-core fiber 1 can be intensified. In one or more embodiments, the refractive index of the inner clad 12 is the same refractive index as the refractive index of the clad 20.

Because each core element 10 has the refractive index described above, the clad 20 and each inner clad 12 are made of quartz to which dopant is not added, each core 11 is made of quartz to which dopant such as germanium to increase a refractive index is added, and the low refractive index layer 13 is made of quartz to which dopant such as fluorine to decrease a refractive index is added.

In addition, each core element 10 propagates light of an LP01 mode and light of an LP11 mode. In the light of the LP01 mode propagated through each core element 10, an effective area $A_{eff}$ at a wavelength of 1550 nm is almost equal to 80 $\mu m^2$, from a viewpoint of connectivity with a standard single mode fiber. Here, combinations of a relative refractive index difference $\Delta$ of the core 11 to the clad 20 when an effective area $A_{eff}$ of the light of the LP01 mode to be light of a wavelength of 1550 nm becomes 80 $\mu m^2$ and a radius $r_1$ of the core 11, in the case in which a relative refractive index difference $\Delta_t$ of the low refractive index layer 13 to the clad 20 is −0.7% and a ratio $r_2/r_1$ of the radius $r_1$ of the core 11 and a radius $r_2$ of the inner clad 12 is 1.7, are shown in Table 1.

TABLE 1

| $\Delta$ [%] | 0.4 | 0.41 | 0.42 | 0.43 | 0.44 | 0.45 | 0.46 | 0.47 | 0.48 | 0.49 | 0.5 |
|---|---|---|---|---|---|---|---|---|---|---|---|
| $r_1$ [$\mu m$] | 5 | 5.04 | 5.07 | 5.1 | 5.13 | 5.17 | 5.2 | 5.22 | 5.25 | 5.28 | 5.31 |

In this case, an effective area $A_{eff}$ of the light of the LP11 mode propagated through the core 11 at the wavelength of 1550 nm is roughly 92 $\mu m^2$. In addition, a propagation loss of the light propagated through the core 11 is 0.30 dB/km or less, for example.

In addition, each high-loss core 15 has a refractive index higher than the refractive index of the clad and propagates the light of the wavelength propagated by the core 11 in the LP01 mode. For example, when the light of the wavelength of 1550 nm is propagated, a relative refractive index difference of the high-loss core 15 to the clad 20 is 0.29% and a radius thereof is 3.0 $\mu m$.

Each high-loss core 15 has the refractive index described above. For this reason, for example, when the clad 20 is made of quartz to which dopant is not added, each high-loss core 15 is made of quartz to which dopant such as germanium to increase a refractive index is added.

In addition, in FIG. 2, a broken line shows an effective refractive index of the light of each LP mode propagated through the core 11 and an effective refractive index of the light of the LP01 mode propagated through the high-loss core 15. As apparent from FIG. 2, in the multi-core fiber 1, at the wavelength of the light propagated through the core 11, an effective refractive index of the light of the LP11 mode to be a secondary LP mode of the core 11 and an effective refractive index of the light of the LP01 mode to be a primary LP mode of the high-loss core 15 are matched with each other. A propagation constant corresponds to the effective refractive index. Therefore, in one or more embodiments, a propagation constant of the light of the LP11 mode of the core 11 and a propagation constant of the light of the LP01 mode of the high-loss core 15 are matched with each other. For this reason, crosstalk can occur between the light of the LP11 mode propagated through the core 11 and the light of the LP01 mode propagated through the high-loss core 15.

Meanwhile, as apparent from FIG. 2, in the multi-core fiber 1, at the wavelength of the light propagated through the core 11, an effective refractive index of the light of the LP01 mode of the core 11 and an effective refractive index of the light of the LP01 mode of the high-loss core 15 are different from each other. Therefore, the light of the LP01 mode propagated through the core 11 is suppressed from being moved to the high-loss core 15 by the crosstalk.

As such, to match the propagation constant of the light of the LP11 mode of the core 11 with the propagation constant of the light of the LP01 mode of the high-loss core 15, for example, in the case in which the light of the wavelength of 1550 nm is propagated, as described above, when the relative refractive index difference $\Delta_t$ of the low refractive index layer 13 to the clad 20 is −0.7%, the ratio $r_2/r_1$ of the radius $r_1$ of the core 11 and the radius $r_2$ of the inner clad 12 is 1.7, the relative refractive index difference $\Delta$ of the core 11 to the clad 20 is 0.45%, and the radius of the core 11 is 5.17 $\mu m$, a relative refractive index difference of the high-loss core 15 to the clad 20 is 0.29% and a radius of the high-loss core 15 is 3.0 $\mu m$.

In addition, the high-loss core 15 is configured to attenuate propagated light more than the core 11. For example, a propagation loss of the light propagated through the high-loss core 15 is 3 dB/km or more. If the propagation loss of the light is 3 dB/km or more, the light is propagated through the high-loss core 15 by 10 km, so that power can be set to 1/1000 or less. To realize this configuration, in the manufacturing course of the multi-core fiber 1, hydroxyl groups may be passed through a glass rod becoming the high-loss core 15 and oxygen may be excessively flown at the time of dewatering.

In addition, the refractive index of the cover layer 30 is higher than the refractive index of the clad 20. The cover layer 30 has a property of absorbing light and light reaching the cover layer 30 from the clad 20 is absorbed into the cover layer 30 and disappears. As an example of a material configuring the cover layer 30, an ultraviolet curing resin can be used.

Next, a relation of a core pitch between the cores 11 and crosstalk will be described. Here, the core pitch is an inter-center distance of the cores 11 adjacent to each other.

Figure 3:
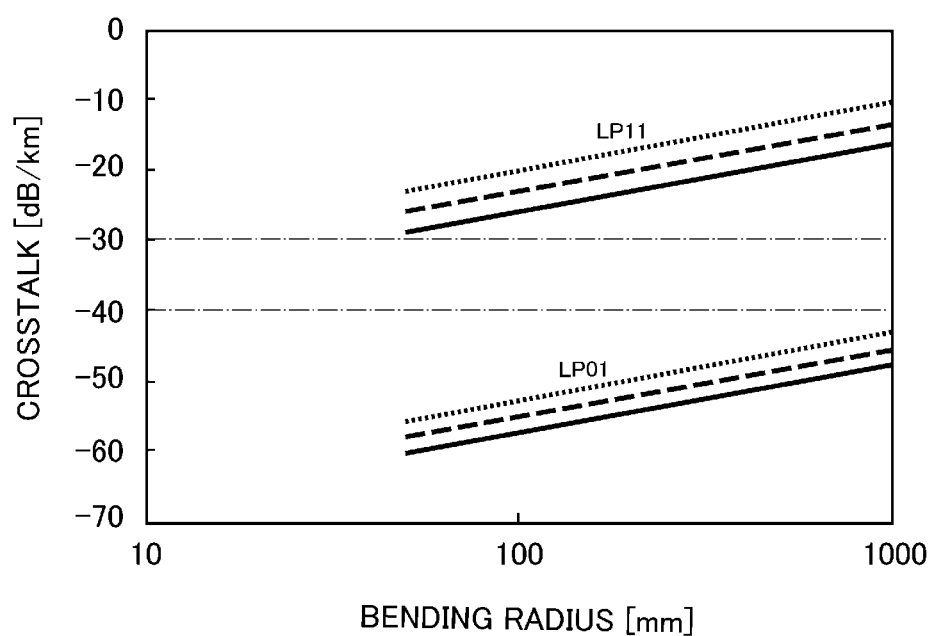
FIG. 3 is a diagram illustrating a calculation result of a relation of a bending radius of the multi-core fiber according to one or more embodiments and crosstalk.

FIG. 3 is a diagram illustrating a calculation result of a relation of a bending radius of the multi-core fiber 1 according to one or more embodiments and the crosstalk. In the calculation of FIG. 3, a core pitch $\Lambda$ is set to 32 $\mu m$ and wavelengths of the light of the LP01 mode and the light of the LP11 mode are set to 1550 nm. In FIG. 3, a solid line shows a calculation result in which the relative refractive index difference Δ of the core 11 to the clad 20 is set to 0.45%, the radius of the core 11 is set to 5.17 μm, the ratio $r_2/r_1$ of the radius $r_1$ of the core 11 and the radius $r_2$ of the inner clad 12 is 1.7, the ratio $W/r_1$ of the radius $r_1$ of the core 11 and the thickness W of the low refractive index layer 13 is set to 0.9, and the core pitch Λ is set to 32 μm. In addition, a calculation result shown by a broken line is different from the calculation result shown by the solid line in that the relative refractive index difference Δ of the core 11 to the clad 20 is set to 0.46%, the radius of the core 11 is set to 5.20 μm, and the ratio $W/r_1$ of the radius $r_1$ of the core 11 and the thickness W of the low refractive index layer 13 is set to 0.8. In addition, a calculation result shown by a dotted line is different from the calculation result shown by the solid line in that the relative refractive index difference Δ of the core 11 to the clad 20 is set to 0.47%, the radius of the core 11 is set to 5.22 μm, and the ratio $W/r_1$ of the radius $r_1$ of the core 11 and the thickness W of the low refractive index layer 13 is set to 0.7.

As illustrated in FIG. 3, a result in which the crosstalk of the light of the LP01 mode is smaller than −40 dB/km in all cases is obtained. In addition, a result in which the crosstalk of the light of the LP11 mode is larger than −30 dB/km in all cases is obtained. That is, in the case of the above conditions, if the core pitch is 32 μm, the crosstalk of the light of the LP01 mode can be set to −40 dB/km or less and the crosstalk of the light of the LP11 mode can be set to −30 dB/km or more. In FIG. 3, in the C band and the L band, the wavelength of the light of the LP01 mode is calculated as a wavelength where an effective area $A_{eff}$ is largest and the wavelength of the light of the LP11 mode is calculated as a wavelength where the effective area $A_{eff}$ is smallest. Therefore, there is the core pitch Λ where the crosstalk of the light of the LP01 mode can be set to a small value not interfering with the optical communication and the crosstalk of the light of the LP11 mode can be set to a large value, when the light of the LP01 mode and the light of the LP11 mode are propagated in the same wavelength band.

Therefore, the core pitch Λ of the multi-core fiber 1 according to one or more embodiments is set to a distance at which the crosstalk of the light of the LP01 mode (primary LP mode) becomes −40 dB/km or less and the crosstalk of the light of the LP11 mode (secondary LP mode) becomes −30 dB/km or more.

For this reason, in the multi-core fiber 1 according to one or more embodiments, the crosstalk of the light of the LP01 mode propagated through each core element 10 is suppressed. However, the light of the LP11 mode propagated through each core element can be moved between the core elements 10 adjacent to each other, by the crosstalk.

Figure 4:
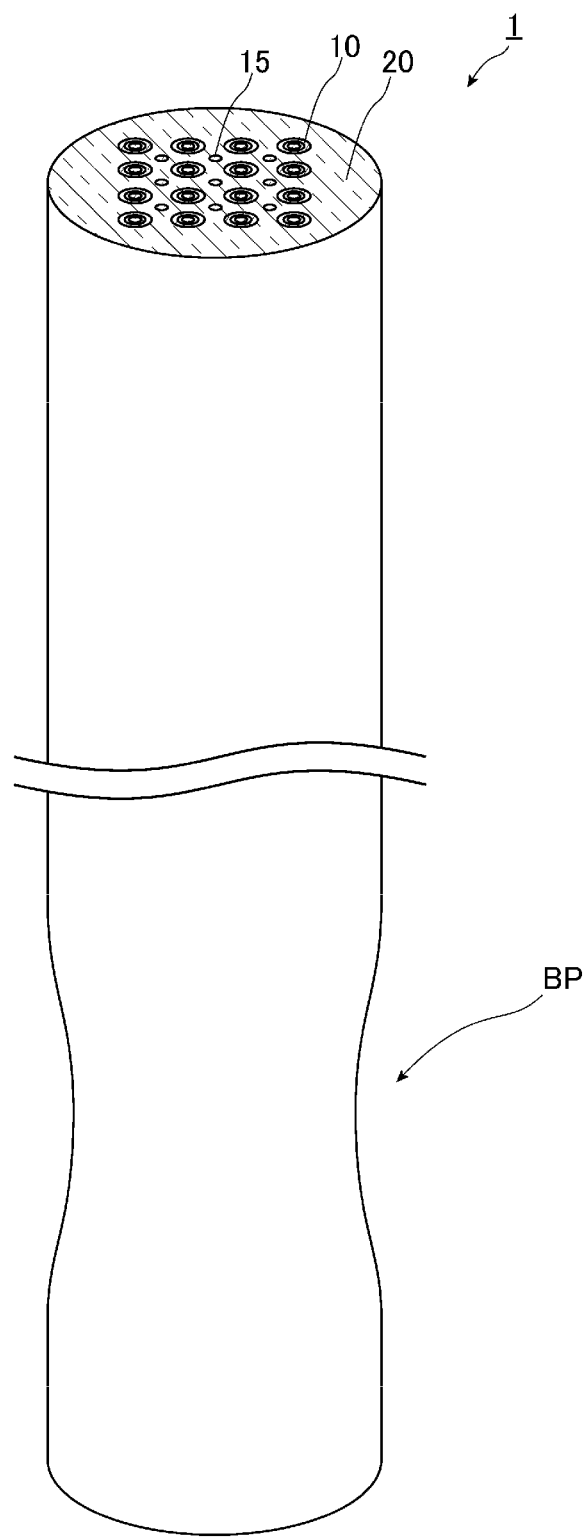
FIG. 4 is a side view of the multi-core fiber of FIG. 1.

FIG. 4 is a side view of the multi-core fiber 1 of FIG. 1. However, in FIG. 4, the cover layer 30 is omitted to facilitate understanding. As illustrated in FIG. 4, the multi-core fiber 1 according to one or more embodiments further includes an extension portion BP that extends such that diameters of the plurality of cores 11 decrease, in a part of the plurality of cores 11 in a longitudinal direction. The extension portion BP is extended by partially removing the cover layer 30 of the multi-core fiber 1, heating the multi-core fiber 1 from the outside of the clad 20, and drawing the multi-core fiber 1.

Figure 5:
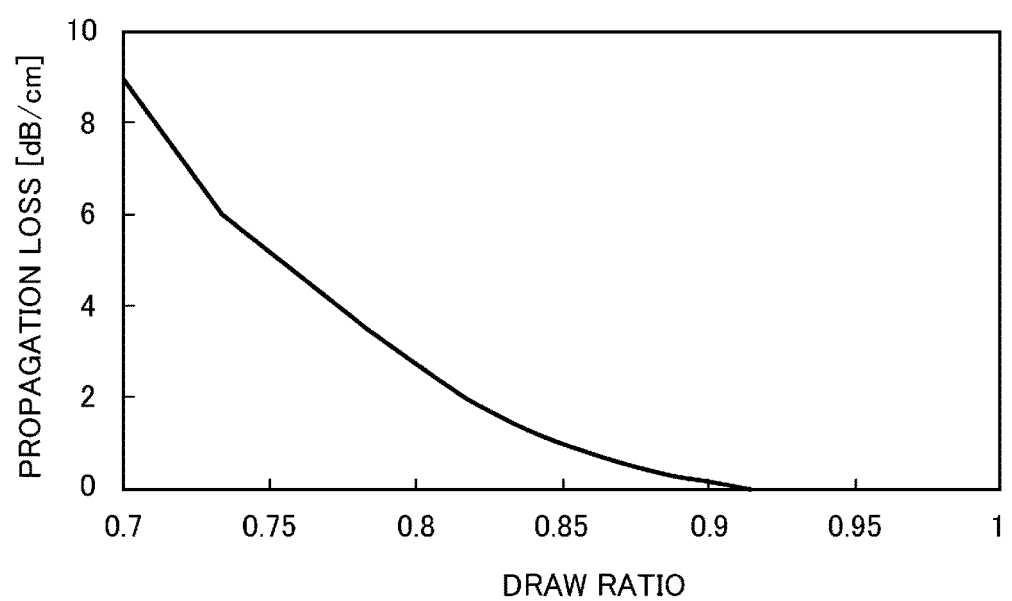
FIG. 5 is a diagram illustrating a calculation result of a relation of a draw ratio and a propagation loss of light of an LP11 mode.

FIG. 5 is a diagram illustrating a calculation result of a relation of a draw ratio and a propagation loss of the light of the LP11 mode. When the calculation of FIG. 5 is performed, a relative refractive index difference $Δ_t$ of a low refractive index layer 13 to the clad 20 is set to −0.7%, a ratio $r_2/r_1$ of a radius $r_1$ of the core 11 and a radius $r_2$ of an inner clad 12 is set to 1.7, a relative refractive index difference Δ of the core 11 to the clad 20 is set to 0.45%, the radius of the core 11 is set to 5.17 μm, and a ratio $W/r_1$ of the radius $r_1$ of the core 11 and a thickness W of the low refractive index layer 13 is set to 0.9. From FIG. 5, if a diameter reduction ratio of the extension portion BP to a non-extension portion is set to about 0.6, that is, a diameter of each member of the multi-core fiber 1 in the extension portion BP is set to 0.6 times as large as a diameter of each member of the multi-core fiber 1 in the diameter non-reduction portion, it can be anticipated that a loss of the light of the LP11 mode propagated through the core element 10 becomes 10 dB/cm. Therefore, the extension portion BP of the diameter reduction ratio of about 0.6 is provided by about 2 cm, so that the light of the LP11 mode can be eliminated not to obstruct optical communication. In this case, in the LP01 mode to be a basic mode, a loss of light due to extension is little and rarely affects the optical communication.

As such, the multi-core fiber 1 according to one or more embodiments is a multi-core fiber for performing communication using light of a primary LP mode in a communication band and includes the plurality of cores 11 that propagate light up to a secondary LP mode and the plurality of high-loss cores 15 that have a higher loss of propagated light than the cores 11. In addition, the crosstalk occurs between the light of the secondary LP mode propagated through the cores 11 and the light of the primary LP mode propagated through the high-loss cores 15.

Therefore, according to the multi-core fiber 1 according to one or more embodiments, confinement of the light of the primary mode in the cores 11 can be intensified. As a result, the crosstalk of the light of the primary mode can be further suppressed as compared with a multi-core fiber configured using cores propagating only the light of the primary LP mode. For this reason, a degree of freedom for designing a core pitch and a degree of freedom for designing a refractive index or a diameter of each core are further improved as compared with the multi-core fiber propagating only the light of the primary LP mode.

Because the crosstalk occurs between the light of the secondary LP mode propagated through the cores 11 and the light of the primary LP mode propagated through the high-loss cores 15, the light of the secondary LP mode propagated through the cores 11 can be moved to the high-loss cores 15. For this reason, the light of the secondary LP mode propagated through the cores 11 is attenuated. In addition, because the high-loss cores 15 have a loss of propagated light, the light moving from the cores 11 to the high-loss cores 15 is attenuated. In this way, the light of the secondary LP mode unnecessary for communication can be eliminated.

In addition, in the multi-core fiber 1 according to one or more embodiments, the propagation constant of the light of the secondary LP mode propagated through the cores 11 and the propagation constant of the light of the primary LP mode propagated through the high-loss cores 15 are matched with each other. Therefore, an amount of crosstalk between the light of the secondary LP mode propagated through the cores 11 and the light of the primary LP mode propagated through the high-loss cores 15 can be maximized and the light of the secondary LP mode propagated through the cores 11 can be moved to the high-loss cores 15 more efficiently. As a result, the light of the secondary LP mode unnecessary for the communication can be efficiently eliminated.

In addition, in the multi-core fiber 1 according to one or more embodiments, the distance between the cores 11 adjacent to each other is the distance at which the crosstalk of the light up to the primary LP mode becomes −40 dB/km or less and the crosstalk of the light of the secondary LP mode becomes −30 dB/km or more. Therefore, the crosstalk of the light up to the primary LP mode used for the communication is suppressed and the crosstalk of the light of the secondary LP mode to be light unnecessary for the communication occurs. For this reason, the secondary light can be moved to the cores 11 causing the crosstalk with the high-loss cores 15, by the crosstalk. Therefore, even if there is the core 11 which is not adjacent to the high-loss cores 15 and in which it is hard to cause the crosstalk with the high-loss cores 15, the light of the secondary LP mode can be moved from the corresponding core 11 to the high-loss core 15 via other core 11, by the crosstalk. As a result, even if there is the core 11 not causing the crosstalk with the high-loss core 15 directly, the light of the secondary LP mode can be eliminated.

In addition, in the multi-core fiber 1 according to one or more embodiments, the high-loss core 15 is disposed at the position surrounded by the three or more cores 11. Therefore, the high-loss core 15 can cause the crosstalk with each core 11 and the light of the secondary LP mode can be moved efficiently from the core 11 to the high-loss core 15.

In addition, the multi-core fiber 1 according to one or more embodiments further includes the extension portion BP that extends such that the diameters of the plurality of cores 11 decrease, in the part of the plurality of cores 11 in the longitudinal direction. In the extension portion BP, the plurality of cores 11 propagate the light up to the primary LP mode and propagation of the light of the secondary LP mode is suppressed. In the extension portion BP according to one or more embodiments, the loss of the light of the secondary LP mode propagated through the plurality of cores 11 is 20 dB or more. The extension portion BP is provided, so that a higher loss of light of the secondary LP mode can be caused, and the light of the secondary LP mode unnecessary for the communication can be eliminated more appropriately.

The present invention has been described using the above embodiments as examples. However, the present invention is not limited thereto.

For example, in the multi-core fiber 1 according to one or more embodiments, the extension portion BP may not be provided. However, the extension portion BP is provided from a viewpoint of more appropriately eliminating the light of the LP11 mode unnecessary for the communication.

In addition, in one or more embodiments, the 16 core elements 10 are disposed in the square lattice shape. However, in the multi-core fiber according to one or more embodiments of the present invention, the number of core elements 10 may be plural and the arrangement or the number thereof is not limited in particular. For example, each of the plurality of core elements 10 may be disposed on each lattice point of a triangular lattice. In this case, the high-loss core 15 is disposed at a position surrounded by the three core elements.

In addition, in the multi-core fiber 1 according to one or more embodiments, the plurality of high-loss cores 15 are disposed and each high-loss core 15 is configured to be surrounded by the four cores 11. However, the number of high-loss cores 15 may be one. Even when the number of high-loss cores is one, the light of the LP02 mode of the core 11 causing the crosstalk with at least the high-loss core 15 can be attenuated. In addition, when the crosstalk of the light of the LP11 mode occurs in the cores 11 adjacent to each other, like the multi-core fiber 1 according to one or more embodiments, the light of the LP11 mode can be moved from the core 11 not causing the crosstalk with the high-loss core 15 to the core 11 causing the crosstalk with the high-loss core 15.

Because the high-loss cores 15 may cause the crosstalk with at least one core 11, the high-loss cores 15 may be disposed on outer circumferential sides of the plurality of cores 11. In addition, even if the propagation constant of the light of the LP11 mode of the core 11 and the propagation constant of the light of the LP01 mode of the high-loss core 15 are slightly different from each other, the crosstalk may occur between the light of the LP11 mode propagated through the core 11 and the light of the LP01 mode propagated through the high-loss core 15 and the crosstalk between the light of the LP01 mode propagated through the core 11 and the light of the LP01 mode propagated through the high-loss core 15 may be suppressed.

In addition, in one or more embodiments, the multi-core fiber 1 is configured such that the single mode communication is performed using the light of the LP01 mode in the communication band, each core 11 propagates the light of the LP01 mode and the light of the LP11 mode, and the light of the LP11 mode is eliminated. However, the present invention is not limited thereto. That is, one or more embodiments of the present invention can be used in the case in which few-mode communication or multi-mode communication is performed and each core may be configured to propagate light up to a higher-order mode by a 1 LP mode as compared with a mode used for communication and the light of the higher-order mode by the 1 LP mode may be eliminated by the high-loss core 15. If this is generalized, a multi-core fiber for performing communication using light up to an xth-order LP mode (where x is an integer of 1 or more) in a communication band includes a plurality of signal light propagation cores that propagate light up to an (x+1)th-order LP mode and at least one high-loss core that has a higher loss of propagated light than the signal light propagation cores. Crosstalk occurs between light of the (x+1)th-order LP mode propagated through at least one signal light propagation core and light of a primary LP mode propagated through at least one high-loss core.

As such, even when the multi-core fiber performs the communication using the light up to the xth-order LP mode in the communication band, the extension portion BP is provided. In this case, in the extension portion BP, a loss of the light of the (x+1)th-order LP mode is 20 dB or more and an excessive loss of the light of the xth-order LP mode is more 0.001 dB or less.

In addition, in one or more embodiments and the modification, each core 11 is configured to be surrounded by the inner clad 12 and the low refractive index layer 13. However, the present invention is not limited thereto. For example, the inner clad 12 may be omitted in each core element 10 and the core 11 may be configured to be surrounded by the low refractive index layer 13 directly. In addition, the inner clad 12 and the low refractive index layer 13 may be omitted in each core element 10 and the core 11 may be surrounded by the clad 20 directly.

As described above, according to one or more embodiments of the present invention, a multi-core fiber capable of improving a degree of freedom for design can be provided and the multi-core fiber can be used in a field of optical communication.

REFERENCE SIGNS LIST

1 . . . multi-core fiber
10 . . . core element

11 ... core (signal light propagation core)
12 ... inner clad
13 ... low refractive index layer
15 ... high-loss core
20 ... clad
30 ... cover layer
BP ... extension portion
Tc ... clad thickness
Λ ... core pitch Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A multi-core fiber for performing communication using light up to an xth-order LP mode (where x is an integer of 1 or more) in a communication band, the multi-core fiber comprising:
   a plurality of signal light propagation cores that propagate light up to an (x+1)th-order LP mode; and
   at least one high-loss core that has a higher loss of propagated light than the signal light propagation cores, wherein
   crosstalk occurs between light of the (x+1)th-order LP mode propagated through at least one signal light propagation core and light of a primary LP mode propagated through at least one high-loss core, and
   a distance between the signal light propagation cores adjacent to each other is a distance at which crosstalk of the light up to the xth-order LP mode becomes less than or equal to −40 dB/km and crosstalk of the light of the (x+1)th-order LP mode becomes greater than or equal to −30 dB/km.

2. A multi-core fiber for performing communication using light up to an xth-order LP mode (where x is an integer of 1 or more) in a communication band, the multi-core fiber comprising:
   a plurality of signal light propagation cores that propagate light up to an (x+1)th-order LP mode; and
   at least one high-loss core that has a higher loss of propagated light than the signal light propagation cores, wherein
   crosstalk occurs between light of the (x+1)th-order LP mode propagated through at least one signal light propagation core and light of a primary LP mode propagated through at least one high-loss core, and
   the high-loss core is disposed at a position surrounded by the three or more signal light propagation cores.

3. A multi-core fiber for performing communication using light up to an xth-order LP mode (where x is an integer of 1 or more) in a communication band, the multi-core fiber comprising:
   a plurality of signal light propagation cores that propagate light up to an (x+1)th-order LP mode;
   at least one high-loss core that has a higher loss of propagated light than the signal light propagation cores; and
   an extension portion that extends such that diameters of the plurality of signal light propagation cores decrease, in a part of the plurality of signal light propagation cores, in a longitudinal direction, wherein
   crosstalk occurs between light of the (x+1)th-order LP mode propagated through at least one signal light propagation core and light of a primary LP mode propagated through at least one high-loss core, and
   in the extension portion, the plurality of signal light propagation cores propagate the light up to the xth-order LP mode and propagation of the light of the (x+1)th-order LP mode is suppressed.

4. The multi-core fiber according to claim 3, wherein, in the extension portion, a loss of the light of the (x+1)th-order LP mode propagated through the plurality of signal light propagation cores is greater than or equal to 20 dB.

* * * * *